{| |}

(12) United States Patent  
Gokturk et al.

(10) Patent No.: US 8,233,702 B2  
(45) Date of Patent: Jul. 31, 2012

(54) COMPUTER IMPLEMENTED TECHNIQUE FOR ANALYZING IMAGES

(75) Inventors: Salih Burak Gokturk, Mountain View, CA (US); Lorenzo Torresani, Cambridge (GB); Kuang-chih Lee, Union City, CA (US); Dragomir Anguelov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1195 days.

(21) Appl. No.: 11/841,355

(22) Filed: Aug. 20, 2007

(65) Prior Publication Data

US 2008/0199075 A1    Aug. 21, 2008

Related U.S. Application Data

(60) Provisional application No. 60/822,911, filed on Aug. 18, 2006.

(51) Int. Cl.
*G06K 9/00*    (2006.01)
*G06K 9/62*    (2006.01)
*G05B 13/02*   (2006.01)

(52) U.S. Cl. ........ 382/155; 382/118; 382/159; 382/160; 700/28; 700/48; 700/49

(58) Field of Classification Search .......... 382/118–160; 700/28–49

See application file for complete search history.

(56) References Cited

U.S. PATENT DOCUMENTS

| | | | |
|---|---|---|---|
| 5,296,945 A | 3/1994 | Nishikawa et al. |
| 5,450,504 A | 9/1995 | Calia |
| 5,734,749 A | 3/1998 | Yamada et al. |
| 5,781,650 A | 7/1998 | Lobo et al. |
| 5,845,639 A | 12/1998 | Hochman et al. |
| 5,982,912 A | 11/1999 | Fukui et al. |
| 6,035,055 A | 3/2000 | Wang et al. |
| 6,173,068 B1 | 1/2001 | Prokoski |
| 6,353,823 B1 | 3/2002 | Kumar |
| 6,381,346 B1 | 4/2002 | Eraslan |
| 6,397,219 B2 | 5/2002 | Mills |

(Continued)

FOREIGN PATENT DOCUMENTS

JP    2002-328925    11/2002

(Continued)

OTHER PUBLICATIONS

Weinberger et al., "Nonlinear Dimensionality Reduction by Semidefinite Programming and Kernel Matrix Factorization", Proceedings of the 10th International Workshop on Artificial Intelligence and Statistics, 2005, pp. 381-388.*

(Continued)

*Primary Examiner* — Matthew Bella
*Assistant Examiner* — Jose M Torres
(74) *Attorney, Agent, or Firm* — Mahamedi Paradice Kreisman LLP; Zurvan Mahamedi

(57) ABSTRACT

An input image is received, represented by a matrix D having a first number of dimensions. Each of the first number of dimensions may represent or correspond to a portion of the image. A metric objective may be identified. A dimensional reduction on the matrix D may then be performed that optimize the metric objective, so that a matrix d of a second number of dimensions is identified to represent the input image, where the second number of dimensions is less than the first number of dimensions.

18 Claims, 4 Drawing Sheets

U.S. PATENT DOCUMENTS

| | | | |
|---|---|---|---|
| 6,418,430 B1 | 7/2002 | DeFazio et al. | |
| 6,427,020 B1 | 7/2002 | Rhoads | |
| 6,546,185 B1 | 4/2003 | Kim et al. | |
| 6,549,913 B1 | 4/2003 | Murakawa | |
| 6,556,196 B1 | 4/2003 | Blanz et al. | |
| 6,556,713 B2 | 4/2003 | Kobayashi et al. | |
| 6,606,417 B1 | 8/2003 | Brechner | |
| 6,785,421 B1 | 8/2004 | Gindele et al. | |
| 6,801,641 B2 | 10/2004 | Eraslan | |
| 6,819,783 B2 | 11/2004 | Goldberg et al. | |
| 6,919,892 B1 | 7/2005 | Cheiky et al. | |
| 6,925,197 B2 | 8/2005 | Dimitrova et al. | |
| 7,006,236 B2 | 2/2006 | Tomasi et al. | |
| 7,027,620 B2 * | 4/2006 | Martinez | 382/118 |
| 7,054,468 B2 * | 5/2006 | Yang | 382/118 |
| 7,140,550 B2 | 11/2006 | Ramachandran | |
| 7,203,356 B2 | 4/2007 | Gokturk et al. | |
| 7,310,431 B2 | 12/2007 | Gokturk et al. | |
| 7,340,077 B2 | 3/2008 | Gokturk et al. | |
| 7,382,903 B2 | 6/2008 | Ray | |
| 7,583,271 B2 | 9/2009 | Kawakami et al. | |
| 7,643,671 B2 | 1/2010 | Dong et al. | |
| 7,657,100 B2 | 2/2010 | Gokturk et al. | |
| 7,657,126 B2 | 2/2010 | Gokturk et al. | |
| 7,660,468 B2 | 2/2010 | Gokturk et al. | |
| 7,681,140 B2 | 3/2010 | Ebert | |
| 7,689,043 B2 * | 3/2010 | Austin et al. | 382/224 |
| 7,711,155 B1 | 5/2010 | Sharma et al. | |
| 7,853,085 B2 | 12/2010 | Miller | |
| 2001/0033690 A1 | 10/2001 | Berche et al. | |
| 2002/0097893 A1 | 7/2002 | Lee et al. | |
| 2002/0103813 A1 | 8/2002 | Frigon | |
| 2002/0107718 A1 | 8/2002 | Morrill et al. | |
| 2002/0114522 A1 | 8/2002 | Seeber | |
| 2002/0187774 A1 | 12/2002 | Ritter et al. | |
| 2003/0028451 A1 | 2/2003 | Ananian | |
| 2003/0063778 A1 | 4/2003 | Rowe et al. | |
| 2003/0063779 A1 | 4/2003 | Wrigley | |
| 2003/0169906 A1 | 9/2003 | Gokturk et al. | |
| 2003/0195901 A1 | 10/2003 | Shin et al. | |
| 2003/0202683 A1 | 10/2003 | Ma et al. | |
| 2004/0003001 A1 | 1/2004 | Shimura | |
| 2004/0215657 A1 | 10/2004 | Drucker et al. | |
| 2004/0264810 A1 | 12/2004 | Taugher et al. | |
| 2005/0002568 A1 | 1/2005 | Chupeau et al. | |
| 2005/0078885 A1 | 4/2005 | Ozaki et al. | |
| 2005/0094897 A1 | 5/2005 | Zuniga | |
| 2005/0111737 A1 | 5/2005 | Das et al. | |
| 2005/0271304 A1 | 12/2005 | Retterath et al. | |
| 2006/0008150 A1 * | 1/2006 | Zhao et al. | 382/190 |
| 2006/0097988 A1 | 5/2006 | Hong | |
| 2006/0133699 A1 | 6/2006 | Widrow et al. | |
| 2006/0143176 A1 | 6/2006 | Mojsilovic et al. | |
| 2006/0173560 A1 | 8/2006 | Widrow et al. | |
| 2006/0227992 A1 | 10/2006 | Rathus et al. | |
| 2006/0251292 A1 | 11/2006 | Gokturk et al. | |
| 2006/0251338 A1 | 11/2006 | Gokturk et al. | |
| 2006/0251339 A1 | 11/2006 | Gokturk et al. | |
| 2007/0003113 A1 | 1/2007 | Goldberg | |
| 2007/0081744 A1 | 4/2007 | Gokturk et al. | |
| 2007/0258645 A1 | 11/2007 | Gokturk et al. | |
| 2008/0080745 A1 | 4/2008 | Gokturk et al. | |
| 2008/0082426 A1 | 4/2008 | Gokturk et al. | |
| 2008/0091572 A1 | 4/2008 | Kraft et al. | |
| 2008/0154625 A1 | 6/2008 | Serbanescu | |
| 2008/0162269 A1 | 7/2008 | Gilbert | |
| 2008/0162574 A1 | 7/2008 | Gilbert | |
| 2008/0212849 A1 | 9/2008 | Gao | |
| 2009/0019008 A1 | 1/2009 | Moore et al. | |
| 2009/0034782 A1 | 2/2009 | Gering | |
| 2009/0177628 A1 | 7/2009 | Yanagisawa et al. | |
| 2009/0196510 A1 | 8/2009 | Gokturk et al. | |
| 2009/0208116 A1 | 8/2009 | Gokturk et al. | |
| 2009/0248599 A1 | 10/2009 | Hueter et al. | |
| 2010/0082604 A1 | 4/2010 | Gutt et al. | |
| 2010/0135582 A1 | 6/2010 | Gokturk et al. | |
| 2010/0135597 A1 | 6/2010 | Gokturk et al. | |

FOREIGN PATENT DOCUMENTS

| | | |
|---|---|---|
| JP | 2003-216866 A | 7/2003 |
| JP | 2004-220074 A | 8/2004 |
| JP | 2006-119836 | 11/2006 |
| KR | 1020070077908 A | 7/2007 |

OTHER PUBLICATIONS

Roweis et al., "Nonlinear Dimensionality Reduction by Locally Linear Embedding", Science, vol. 290, Dec. 22, 2000, pp. 2323-2326.*

Weinberger et al., "Distance Metric Learning for Large Margin Nearest Neighbor Classification", Advances in Neural Information Processing Systems, vol. 18, 2006, pp. 1473-1480.*

U.S. Appl. No. 11/246,741, filed Oct. 7, 2005, Gokturk et al.

U.S. Appl. No. 11/936,694, filed Nov. 7, 2007, Gokturk et al.

U.S. Appl. No. 11/936,705, filed Nov. 7, 2007, Gokturk et al.

U.S. Appl. No. 11/936,713, filed Nov. 7, 2007, Gokturk et al.

U.S. Appl. No. 11/936,734, filed Nov. 7, 2007, Gokturk et al.

Final Office Action dated Oct. 20, 2008 for U.S. Appl. No. 11/543,758, 7 Pages.

Final Office Action dated Aug. 11, 2008 for U.S. Appl. No. 11/246,741, 18 Pages.

International Preliminary Report on Patentability and Written Opinion of the International Searching Authority in Application PCT/US2006/018016, Oct. 16, 2008, 12 pages.

International Search Report and Written Opinion of the International Searching Authority in Application PCT/US06/38864, U.S.International Searching Authority, Oct. 14, 2008, 16 pages.

International Search Report and Written Opinion of the International Searching Authority in Application PCT/US07/83935, U.S.International Searching Authority, Aug. 18, 2008, 23 pages.

International Search Report and Written Opinion of the International Searching Authority in Application PCT/US06/18016, U.S.International Searching Authority, Jun. 17, 2008, 17 pages.

Non-Final Office Action dated Dec. 6, 2007 for U.S. Appl. No. 11/246,741, 31 Pages.

Non-Final Office Action dated Jun. 3, 2008 for U.S. Appl. No. 11/246,742, 16 Pages.

Non-Final Office Action dated Oct. 27, 2008 for U.S. Appl. No. 11/936,734, 7 Pages.

Non-Final Office Action dated Oct. 21, 2008 for U.S. Appl. No. 11/936,705, 18 Pages.

Non-Final Office Action dated OCt. 16, 2008 for U.S. Appl. No. 11/777,070, 10 Pages.

Non-Final Office Action dated Jun. 6, 2008 for U.S. Appl. No. 11/543,758, 13 Pages.

Tu, Zhuowen et al., "Image Parsing: Unifying Segmentation, Detection, and Recognition," Proceedings of the Ninth IEEE International Conference on Computer Vision (ICCV 2003), University of California, Los Angeles, Los Angeles, CA 90095, 7 pages.

Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San San Francisco, CA 94115, 9 pages.

Action Closing Prosecution mailed Apr. 26, 2010 for U.S. Appl. No. 95/001,307; 20 pages.

Arnold W.M. Smeulders, et al., "Content-Based Image Retrieval at the End of the Early Years", IEEE Transactions on Pattern Analysis and Machine Intelligence, vol. 22, No. 12. Dec. 2000, 32 pages.

Charels Frankel, et al., "WebSeer: An Image Search Engine for the World Wide Web", The University of Chicago, Computer Science Department, 110 East 58th Street, Chicago, Illinois 60637, Technical Report 96-14, Aug. 1, 1996, 24 pages.

Final Office Action mailed May 12, 2010 for U.S. Appl. No. 12/431,706; 12 pages.

Final Office Action dated Jul. 7, 2009 for U.S. Appl. No. 11/777,070, 10 Pages.

Final Office Action dated Jun. 16, 2009 for U.S. Appl. No. 11/936,705, 20 Pages.

Final Office Action dated Jun. 30, 2009 for U.S. Appl. No. 11/246,589, 13 Pages.

Final Office Action dated Jun. 2, 2010 for U.S. Appl. No. 12/395,422. 21 pages.
Final Office Action dated Oct. 27, 2009 for U.S. Appl. No. 11/246,741, 20 Pages.
Gangopadhyay, Aryya, "An image-based system for electronic retailing", Decision Support Systems 32, 2001, Department of Information Systems, University of Mayland Baltimore County, 1000 Hilltop Circle, ACIV 481, Baltimore, MD 21250, 10 pages.
International Preliminary Report on Patentability and Written Opinion of the International Searching Authority in Application PCT/US2007/083935, May 22, 2009, 20 pages.
International Preliminary Report on Patentability in Application PCT/US2006/038864, Nov. 27, 2008, 10 pages.
International Search Report, Written Opinion and Notice of Transmittal of same mailed Aug. 17, 2010 in PCT/US10/037139 10 pages.
International Search Report and Written Opinion mailed Feb. 24, 2010 in PCT/US2009/050600 13 pgs.
Lii, Yi et al., "Object Recognition for Content-Based Image Retrieval", Department of Computer Science and Engineering, University of Washington, Seattle, WA 98195-2350, Jan. 2002, 21 pages.
Liu, James et al., "Smart Shopper: An Agent-Based Web-Mining Approach to Internet Shopping,"IEEE Transactions on Fuzzy Systems, vol. 11, No. 2, Apr. 2003, 12 pages.
Non-Final Office Action dated Sep. 30, 2009 for U.S. Appl. No. 12/431,706. 9 pages.
Non-Final Office Action dated Sep. 14, 2009 for U.S. Appl. No. 11/246,434, 11 pages.
Non-Final Office Action dated Aug. 6, 2009 for U.S. Appl. No. 11/936,734, 6 Pages.
Non-Final Office Action dated Apr. 7, 2009 for U.S. Appl. No. 11/246,741, 21 Pages.
Non-Final Office Action dated Dec. 29, 2008 for U.S. Appl. No. 11/246,589, 19 Pages.
Non-Final Office Action dated May 28, 2009 for U.S. Appl. No. 11/246,434, 6 Pages.
Non-Final Office Action dated Oct. 27, 2008 for U.S. Appl. No. 11/246,434, 11 Pages.
Non-Final Office Action dated Dec. 30, 2008 for U.S. Appl. No. 11/936,713, 15 Pages.
Non-Final Office Action dated Dec. 2, 2009 for U.S. Appl. No. 11/246,589. 14pages.
Non-Final Office Action dated Dec. 15, 2009 for U.S. Appl. No. 12/395,422. 10pages.
Non-Final Office Action dated Feb. 7, 2011 for U.S. Appl. No. 11/685,106, 12 pages.
Non-Final Office Action dated Feb. 7, 2011 for U.S. Appl. No. 12/395,422, 10 pages.
Notice of Allowance dated Aug. 17, 2010 for U.S. Appl. No. 11/246,741, 23 pages.
Notice of Allowance dated Jun. 9, 2010 for U.S. Appl. No. 11/246,434 11 pages.
Notice of Allowance dated Jun. 2, 2010 for U.S. Appl. No. 11/777,070 16 pages.
Notice of Allowance dated Feb. 22, 2010 for U.S. Appl. No. 11/246,343. 6pages.
Notice of Allowance dated Oct. 29, 2010 for U.S. Appl. No. 12/431,706; 9 pages.
Notice of Allowance dated Aug. 11, 2010 for U.S. Appl. No. 11/246,589, 10 pages.
Notice of Allowance dated Apr. 17, 2009 for U.S. Appl. No. 11/543,758, 14 Pages.
Notice of Allowance dated Mar. 1, 2010 for U.S. Appl. No. 11/777,070 11 pages.
Notice of Allowance dated Oct. 1, 2009 for U.S. Appl. No. 11/936,734, 12 Pages.
Notice of Allowance dated Sep. 28, 2009 for U.S. Appl. No. 11/936,713, 15 Pages.
Notice of Allowance dated Sep. 17, 2009 for U.S. Appl. No. 11/936,705 14 Pages.
Notice of Allowance dated Dec. 22, 2008 for U.S. Appl. No. 11/246,742, 12 Pages.
Order Granting/Denying Request for Inter Parts Reexamination mailed Apr. 26, 2010 for U.S. Appl. No. 95/001,30; 15 pages.
Philippe Aigrain, et al., "Content-Based Representation and Retrieval of Visual Media: A State-of-the-Art Review", Multimedia Tools and Applications 3, 179-202, 1996, 24 pages.
Replacement Request for Ex Parte Reexamination dated Mar. 18, 2010 for U.S. Appl. No. 95/001,307, 145 pages.
Wang, James et al., "SIMPLIcity: Semantics-Sensitive Integrated Matching for Picture Libraries" IEEE Transactions on Pattern Analysis and Machine Intelligence, vol. 23, No. 9, Sep. 2001, 17 pages.
Final Office Action dated Sep. 6, 2011 for U.S. Appl. No. 12/395,422, 11 pages.

* cited by examiner (a) (b)

COMPUTER IMPLEMENTED TECHNIQUE FOR ANALYZING IMAGES

RELATED APPLICATIONS

This application claims benefit of priority to Provisional U.S. Patent Application No. 60/822,911, entitled "Large Margin Component Analysis," and filed Aug. 18, 2006. The aforementioned priority application is hereby incorporated by reference in its entirety for all purposes.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-Roms, and flash memory. The use of file folders are the primary source of organization, although applications have been created to aid users in organizing and viewing digital images. Some search engines, such as GOOGLE, also enables users to search for images, primarily by matching text-based search input to text metadata or content associated with images.

DETAILED DESCRIPTION

Figure 1A:
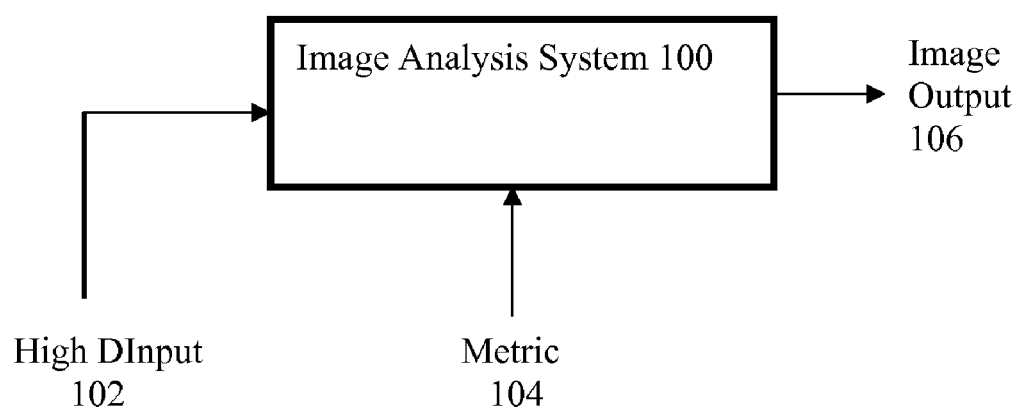
FIG. 1A is a block diagram illustrating an image recognition system on which one or more embodiments of the invention are implemented.

Metric learning has been shown to significantly improve the accuracy of k-nearest neighbor (kNN) classification. In problems involving thousands of features, distance learning algorithms cannot be used due to overfitting and high computational complexity. In such cases, previous work has relied on a two-step solution: first apply dimensionality reduction methods to the data, and then learn a metric in the resulting low-dimensional subspace. Embodiments described herein show that better classification performance can be achieved by unifying the objectives of dimensionality reduction and metric learning. Techniques illustrated herein solve for the low-dimensional projection of the inputs, which minimizes a metric objective. This projection is defined by a significantly smaller number of parameters than metrics learned in input space, and thus this optimization reduces the risks of overfitting. Theory and results are presented for both a linear as well as a kernelized version of the algorithm. What embodiments described here achieve is classification performances similar, and in several cases superior, to those of support vector machines.

Embodiments described herein provide for performing image analysis processes. In one embodiment, an input image is received, represented by a matrix D having a first number of dimensions. Each of the first number of dimensions may represent or correspond to a portion of the image. A metric objective may be identified. A dimensional reduction on the matrix D may then be performed that optimizes the metric objective, so that a matrix d of a second number of dimensions is identified to represent the input image, where the second number of dimensions is less than the first number of dimensions.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Computer-implemented techniques of k-nearest neighbor (kNN) are popular classification algorithms for programmatic analysis of, for example, pixels of an image. In such usages, kNN is used to classify some or all of an image under analysis—for example, a portion of the image may be identified as being a face, an eye socket, a lip etc.

Several reasons account for the widespread use of this method: it is straightforward to implement, it generally leads to good recognition performance as a result of its non-linearity of its decision boundaries, and its complexity is independent of the number of classes. In addition, unlike most alternatives, kNN can be applied even in scenarios where not all categories are given at the time of training, such as, for example, in face verification applications where the subjects to be recognized are not known in advance.

The distance metric used to define the neighbors of a query point plays a fundamental role in the accuracy of kNN classification. In most cases Euclidean distance is used as a similarity measure. This choice is logical when it is not possible to study the statistics of the data prior to classification or when it is fair to assume that all features are equally scaled and equally relevant. However, in most cases the data is distributed in a way so that distance analysis along some specific directions of the features space can be more informative than along others. In such cases and when training data is available in advance, distance metric learning has been shown to yield significant improvement in kNN classification. The key idea of these methods is to apply transformations to the data in order to emphasize the most discriminative directions in the input space. For example, when a face is detected, the algorithm is executed in a direction where facial features are contained. Euclidean distance computation in the transformed space is then equivalent to a non-uniform metric analysis in the original input space.

There are numerous cases where the data to be used for classification is very high-dimensional. An example is classification of imagery data, which often involves input spaces of thousands of dimensions, corresponding to the number of pixels. Metric learning in such high-dimensional spaces cannot be carried out due to overfitting and high computational complexity. In these scenarios, even kNN classification in the input space is prohibitively expensive in terms of storage and computational costs. The traditional solution is to apply dimensionality reduction methods to the data and then learn a suitable metric in the resulting low-dimensional subspace. For example, Principal Component Analysis (PCA) can be used to compute a linear mapping that reduces the data to tractable dimensions. However, dimensionality reduction methods generally optimize objectives unrelated to classification and, as a consequence, might generate representations that are significantly less discriminative than the original data. Thus, metric learning within the subspace might lead to suboptimal similarity measures. What some embodiments described herein illustrate is that better performance can be achieved by directly solving for a low-dimensional embedding that optimizes a measure of kNN classification performance.

Embodiments described herein enhance conventional approaches which learn distance metrics attempting to first reducing the dimensionality of the input space followed by a classification task. What embodiments described herein enable is:

1. A Large Margin Component Analysis (LMCA) algorithm, a technique that solves directly for a low-dimensional embedding of the data such that Euclidean distance in this space minimizes a metric objective. Under an embodiment, one approach solves for only D·d unknowns, where D is the dimensionality of the inputs and d is the dimensionality of the target space. By contrast, conventional algorithm learn a Mahalanobis distance of the inputs by solving for a D×D matrix, using iterative methods. This optimization is unfeasible for large values of D.

2. An embodiment includes a computer implemented technique that learns Mahalanobis distance metrics in non-linear feature spaces, for data under analysis. Such an approach combines the goal of dimensionality reduction with a novel "kernelized" version of a metric learning objective. An embodiment optimizes this combined objective directly. We demonstrate that, even when data is low-dimensional and dimensionality reduction is not needed, this technique can be used to learn nonlinear metrics leading to significant improvement in kNN classification accuracy over previous conventional methods.

FIG. 1A illustrates an image analysis system that is configured in accordance with one or more embodiments of the invention. An image analysis system 100 such as shown and described may implement, for example, recognition of faces, classification of objects, detection and/or classification of objects or facial features, and image reconstruction. The system 100 may be implemented through use of modules and components. The system 100 may execute portions of any equations described herein through use of modules or components. Accordingly, it should be understood that system 100 may implement steps or processes in accordance with various descriptions provided herein, using components or modules.

In one implementation, system 100 may be implemented in a networked environment, and use input received or delivered over a network. Alternatively, system 100 may be implemented as a standalone machine, or on a work station. Numerous other implementation environments are also contemplated.

In an embodiment, image analysis system 100 performs operations on high-dimensional input 102. The input 102 may correspond to images, where pixel count, for example, defines the dimensionality of the input. The image analysis system 100 learns, detects, or receives as input, one or more metrics 104. The image analysis system 100 implements processes (using a module or component) to reduce dimensionality of the input 102 while optimizing metrics 104. The dimensional reduction and optimization may be implemented at one time, such as by way of one equation or interrelated equations. The resulting dimensionality of an output 106 is less than that of the input 102.

Linear Dimensionality Reduction for Large Margin kNN Classifications

The following includes a Large Margin Nearest Neighbor (LMNN) algorithm, a method for metric learning in the context of kNN classification that has been recently presented. Such an approach can be generalized to compute low dimensional projections of the inputs via a direct optimization technique, according to an embodiment.

One characteristic of kNN is that its performance does not depend on linear separability of classes in input space: in order to achieve accurate kNN classification it is sufficient that the majority of the k-nearest points of each test example have correct label. Previous work has exploited this property by learning a linear transformation of the input space that aims at creating consistently labeled k-nearest neighborhoods, i.e. clusters where each training example and its k-nearest points have same label and where points differently labeled are distanced by an additional safety margin. Specifically, given n input examples $x1, \ldots, x_n$ in $R^D$ and corresponding class labels $y1, \ldots, y_n$, they propose to learn the D×D transformation matrix L that optimizes the following objective function:

$$\varepsilon(L) = \sum_{ij} \eta_{ij} \|L(x_i - x_j)\|^2 + \qquad (1)$$

$$c \sum_{ijl} \eta_{ij}(1 - y_{il}) h(\|L(x_i - x_j)\|^2 - \|L(x_i - x_l)\|^2 + 1)$$

where $\eta \in \{0,1\}$ is a binary variable indicating whether example xj is one the k-closest points of xi that share the same label $_{yi}$, c is a positive constant, $yil \in \{0,1\}$ is 1 if (yi=yl), and h(s)=max(s, 0) is the hinge function. The objective $\epsilon(L)$ consists of two contrasting terms. The first aims at pulling closer together points sharing the same label and that were neighbors in the original space. The second term encourages distancing each example $x_i$ from differently labeled points by an amount equal to 1 plus the distance from $x_i$ to any of its k similarly-labeled closest points. This term corresponds to a margin condition similar to that of SVMs and it is used to improve generalization. The constant c controls the relative importance of these two competing terms and it is chosen via cross validation.

Upon optimization of $\epsilon(L)$ test example $x_q$ is classified according to the kNN rule applied to its projection $x'_q = Lx_q$ in the transformed input space using Euclidean distance as similarity metric. Equivalently, such classification can be interpreted as kNN classification in the original input space under the Mahalanobis distance metric induced by matrix $M = L^T L$. Although Equation 1 is non-convex in L, it can be rewritten as a semidefinite program $\epsilon(M)$ in terms of the metric M. Thus, optimizing the objective in M guarantees convergence to the global minimum, regardless of initialization.

When data is very high-dimensional, minimization of $\epsilon(M)$ using semidefinite programming methods is impractical because of slow convergence and over-fitting problems. In such cases, past conventional methods propose applying dimensionality reduction methods, such as PCA, followed by metric learning within the resulting low-dimensional subspace. As outlined above, this procedure leads to suboptimal metric learning. Embodiments provide an alternative approach that solves jointly for dimensionality reduction and metric learning. The key idea for such embodiments is to choose the transformation L in Equation 1 to be a nonsquare matrix of size d×D, with d<<D. Thus L defines a mapping from the high-dimensional input space to a low-dimensional embedding. Euclidean distance in this low-dimensional embedding is equivalent to Mahalanobis distance in the original input space under the rank-deficient metric $M = L^T L$ (M has now rank at most d).

Unfortunately, optimization of $\epsilon(M)$ subject to rank-constraints on M leads to a minimization problem that is no longer convex and that is awkward to solve. Embodiments propose an approach for minimizing the objective that differs from the one previously used. The idea is to optimize Equation 1 directly with respect to the nonsquare matrix L. By minimizing the objective with respect to L rather than with respect to the rank-deficient D×D matrix M, several benefits are achieved. First, embodiments provide that optimization involves only d·D rather than $D^2$ unknowns, which considerably reduces the risk of overfitting. Second, the optimal rectangular matrix L computed with the method described herein automatically satisfies the rank constraints on M without requiring the solution of difficult constraint minimization problems. Although the objective optimized by such a method is also not convex, such a solution provided by an embodiment converges consistently to better metrics than those computed via the application of PCA followed by subspace distance learning (see Section 4).

Embodiments minimize $\epsilon(L)$ using gradient-based optimizers, such as conjugate gradient methods. Differentiating $\epsilon(L)$ with respect to the transformation matrix L gives the following gradient for the update rule:

$$\frac{\partial \varepsilon(L)}{\partial L} = 2L \sum_{ij} \eta_{ij}(x_i - x_j)(x_i - x_j)^T 2cL \qquad (2)$$

$$\sum_{ijl} \eta_{ij}(1 - y_{il})[(x_i - x_j)(x_i - x_j)^T - (x_i - x_l)(x_i - x_l)^T]$$

$$h'(\|L(x_i - x_j)\|^2 - \|L(x_i - x_l)\|^2 + 1)$$

Embodiments described herein handle the non-differentiability of h(s) at s=0, by adopting a smooth hinge function.

Nonlinear Feature Extraction for Large Margin kNN Classification

In the previous section, an algorithm is described that jointly solves for linear dimensionality reduction and metric learning. In this section an embodiment describes how to "kernelize" this method in order to compute non-linear features of the inputs that optimize a distance learning objective. One approach learns a low-rank Mahalanobis distance metric in a high dimensional feature space F, related to the inputs by a nonlinear map $\phi: R^D \rightarrow F$. The analysis may be restricted to nonlinear maps p for which kernel functions k can be used to compute inner products in feature space without carrying out the map: $k(Xi, Xj) = \phi i^T \phi j$, where for brevity $\phi i = \phi(Xi)$.

Embodiments modify the objective $\epsilon(L)$ by substituting inputs Xi with features 0(Xi) into Equation 1. L is now a transformation from the space F into a low-dimensional space $R^d$. What is sought is the transformation L minimizing the modified objective function $\epsilon(L)$ The gradient in feature space can now be written as:

$$\frac{\partial \varepsilon(L)}{\partial L} = 2\sum_{ij} \eta_{ij} L(\varphi i - \varphi j)(\varphi i - \varphi j)^T + \qquad (3)$$

$$2c \sum_{ijl} \eta_{ij}(1 - y_{il}) h'(s_{ijl}) L[(\varphi i - \varphi j)(\varphi i - \varphi j)^T - (\varphi i - \varphi l)(\varphi i - \varphi l)^T]$$

where $s_{ijl} = (\|L(\phi i - \phi j)\|^2 - \|L(\phi i - \phi_l)\|^2 + 1)$.

Let $\Phi = [\phi_l, \ldots, \phi_n]^T$.

An embodiment described herein uses parameterizations of L of the form $L = \Omega \Phi$, where $\Omega$ is some matrix that permits to write L as a linear combination of the feature points. This form of nonlinear map is analogous to that used in kernel-PCA and it parameterizes the transformation L in terms of only d·n parameters, the entries of the matrix $\Omega$. The following Lemma is introduced in order to derive an iterative update rule for L.

Lemma 5.1 The gradient in feature space can be computed as $\partial \epsilon(\mathbf{L})/\partial \mathbf{L} = \Gamma \Omega$, where $\Gamma$ depends on features $\Phi_i$ solely in terms of dot products ($\Phi i^T \Phi j$).

Proof Defining $ki=\Phi\phi i=[k(x_i, xi), \ldots, k(x_n, x_i)]^T$, non-linear feature projections can be computed as $L\phi i=\Omega\Phi\phi_i=\Omega k_i$. From this the following equations can be derived:

$$\frac{\partial \varepsilon(L)}{\partial L} = 2\Omega \sum_{ij} \eta_{ij}(k_i - k_j)(\varphi_i - \varphi_j)^T +$$

$$2c \sum_{ijl} \eta_{ij}(1 - y_{il})h'(s_{ijl})[(k_i - k_j)(\varphi_i - \varphi_j)^T - (k_i - k_l)(\varphi_i - \varphi_l)^T] =$$

$$2\Omega \sum_{ij} \eta_{ij}\left[E_i^{(ki-kj)} - E_j^{(ki-kj)}\right]\Phi +$$

$$2c\Omega \sum_{ijl} \eta_{ij}(1 - y_{il})h'(s_{ijl})\left[E_i^{(ki'-kj')} - E_j^{(ki-kj)} - E_i^{(ki-kl)} + E_l^{(ki-kl)}\right]\Phi$$

where $E^v_i[0, \ldots, v, 0, \ldots 0]$ is the n×n matrix having vector v in the i-th column and all 0 in the other columns. Setting $$\Gamma = 2\Omega \sum_{ij} \eta_{ij}\left[E_i^{(ki-kj)} - E_j^{(ki-kj)}\right] + \quad (4)$$

$$2c\Omega \sum_{ijl} \eta_{ij}(1 - yil)h''(sijl)\left[E_i^{(ki-kj)} - E_j^{(ki-kj)} - E_i^{(ki-kl)} + E_l^{(ki-kl)}\right]$$

proves the Lemma.

What this result provides is to implicitly solve for the transformation without ever computing the features in the high-dimensional space F: the key idea is to iteratively update $\Omega$ rather than L. For example, using gradient descent as optimization the following update rule can be derived:

$$Lnew = Lold - \lambda\frac{\partial c(L)}{aL}\bigg|_{L=Lold} = [\Omega old - \lambda\Gamma old]\Phi = \Omega new(\Phi) \quad (5)$$

where $\lambda$ is the learning rate. This optimization is carried out by iterating the update $\Omega \leftarrow (\Omega - \lambda\Gamma)$ until convergence. For classification, points are projected onto the learned low-dimensional space by exploiting the kernel trick: $L\phi_q = \Omega k_q$.

EXPERIMENTAL RESULTS

In this section the embodiments herein described are compared to the LMNN metric learning algorithm. KLMCA (kernel-LMCA) is used to denote the nonlinear version of the algorithm described herein. In all of the experiments reported here, LMCA was initialized using PCA, while KLMCA used the transformation computed by kernel-PCA as initial guess. The objectives of LMCA and KLMCA were optimized using the steepest descent algorithm. With more sophisticated minimization algorithms no substantial improvement in performance or speed of convergence was achieved. The KLMCA algorithm was implemented using a Gaussian RBF kernel. The number of nearest neighbors, the weight c in Equation 1, and the variance of the RBF kernel, were all automatically tuned using cross-validation.

The first part of the experimental evaluation focuses on classification results on datasets with high-dimensionality, Isolet, AT&T Faces, and StarPlus fMRI:

Isolet is a dataset of speech features from the UC Irvine repository, consisting of 6238 training examples and 1559 testing examples with 617 attributes. There are 26 classes corresponding to the spoken letters to be recognized.

The AT&T Faces[2] database contains 10 grayscale face images of each of 40 distinct sub-jects. The images were taken at different times, with varying illumination, facial expressions and poses. The images were downsampled from the original size 112×92 to size 38×31, corresponding to 1178 input dimensions.

The StarPlus fMRI dataset contains fMRI sequences acquired in the context of a cognitive experiment. In these trials the subject is shown for a few seconds either a picture or a sentence describing a picture. The goal is to recognize the viewing activity of the subject from the fMRI images. The size of the data may be reduced by considering only voxels corresponding to relevant areas of the brain cortex and by averaging the activity in each voxel over the period of the stimulus. This yields data of size 1715 for subject "04847," on which the analysis was restricted. A total number of 80 trials are available for this subject.

Figure 1B:
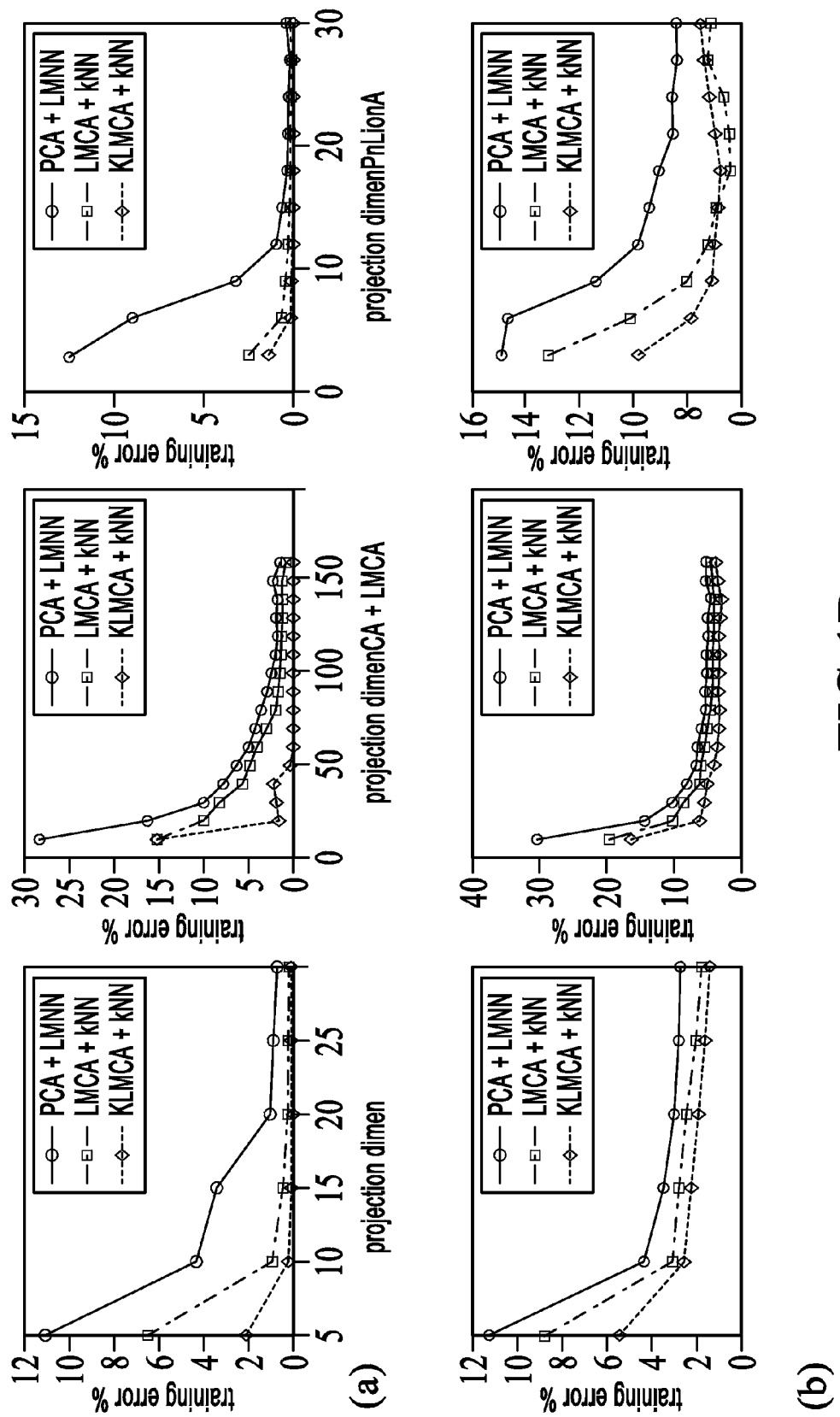
FIG. 1B illustrates classification error rates on high dimensional datasets, under an embodiment of the invention.

Except for Isolet, for which a separate testing set is specified, all of the experimental results were computed by averaging over 100 runs of random splitting of the examples into training and testing sets. For the fMRI experiment, at each iteration 70% of the data was used for training and 30% for testing. For AT&T Faces, training sets were selected by sampling 7 images at random for each person. The remaining 3 images of each individual were used for testing. Unlike LMCA and KLMCA, which directly solve for low-dimensional embeddings of the input data, LMNN cannot be run on datasets of dimensionalities such as those considered here and must be trained on lower-dimensional representations of the inputs. The LMNN algorithm was applied on linear projections of the data computed using PCA. FIG. 1B summarizes the training and testing performances of kNN classification using the metrics learned by the three algorithms for different subspace dimensions. LMCA and KLMCA give considerably better classification accuracy than LMNN on all datasets, with the kernelized version of the algorithm always outperforming the linear version. The difference in accuracy between the algorithms such as described here and LMNN is particularly dramatic when a small number of projection dimensions is used. In such cases, LMNN is unable to find good metrics in the low-dimensional subspace computed by PCA. By contrast, LMCA and KLMCA solve for the low-dimensional subspace that optimizes the classification-related objective of Equation 1, and therefore achieve good performance even when projecting to very low dimensions. In experiments, all three classification algorithms (LMNN, LMCA+kNN, and KLMCA+kNN) performed considerably better than kNN using simple Euclidean distance metric in the subspaces computed by PCA and KPCA. For example, using d=10 in the AT&T dataset, kNN without any metric learning gives a 10.9% testing error rate when used on the PCA features, and a 9.7% testing error rate when applied to the nonlinear features computed by KPCA.

While LMNN is applied to features in a low-dimensional space, LMCA and KLMCA learn a low-rank metric directly from the high-dimensional inputs. Consequently the computational complexity of algorithms described herein is higher than that of LMNN. Experiments have shown that LMCA and KLMCA converge to a minimum quite rapidly, typically within 20 iterations, and thus the complexity of these algorithms is not a limiting factor even when applied to very high-dimensional datasets. As a reference, using d=10 and K=3 on the AT&T dataset, LMNN learns a metric in about 5 seconds, while LMCA and KLMCA converge to a minimum in 21 and 24 seconds, respectively.

Figure 2:
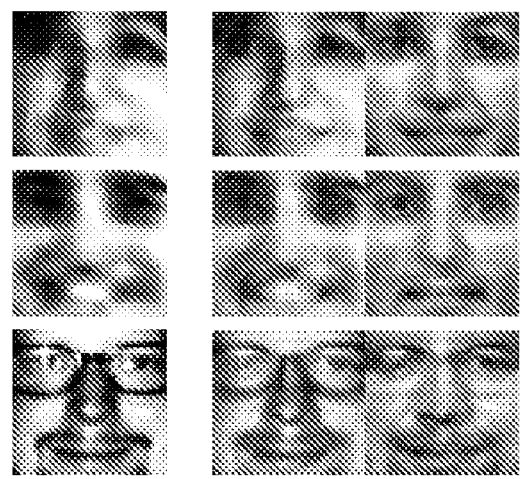
FIG. 2 illustrates using PCA and LMCA (right) for input images, according to embodiments described herein.

It is instructive to look at the preimages of LMCA data embeddings. FIG. 2 shows comparative reconstructions of images obtained from PCA and LMCA features by inverting their linear mappings. LMCA learns invariance to effects that are irrelevant for classification: non-uniform illumination, facial expressions, and glasses (training data contains images with and without glasses for same individuals). The PCA and LMCA subspaces in this experiment were computed from cropped face images of size 50×50 pixels, taken from a set of consumer photographs. The dataset contains 2459 face images corresponding to 152 distinct individuals. A total of d=125 components were used. The subjects shown in FIG. 2 were not included in the training set. For a given target dimensionality, PCA has the property of computing the linear transformation minimizing the reconstruction error under the L2 norm. Unsurprisingly, the PCA face reconstructions are extremely faithful reproductions of the original images. However, PCA accurately reconstructs also visual effects, such as lighting variations and changes in facial expressions, that are unimportant for the task of face verification and that might potentially hamper recognition. By contrast, LMCA seeks a subspace where neighboring examples belong to the same class and points differently labeled are separated by a large margin. As a result, LMCA does not encode effects that are found to be insignificant for classification or that vary largely among examples of the same class. For the case of face verification, LMCA de-emphasizes changes in illumination, presence or absence of glasses and smiling expressions (FIG. 2).

When the input data does not require dimensionality reduction, LMNN and LMCA solve the same optimization problem, but LMNN should be preferred over LMCA in light of its guarantees of convergence to the global minimum of the objective. However, even in such cases, KLMCA can be used in lieu of LMNN in order to extract nonlinear features from the inputs. This use of KLMCA has been evaluated on the following low-dimensional datasets from the UCI repository: Bal, Wine, his, and Ionosphere. The dimensionality of the data in these sets ranges from 4 to 34. In order to compare LMNN with KLMCA under identical conditions, KLMCA was restricted to compute a number of features equal to the input dimensionality, although using additional nonlinear features often results in better classification performance.

Figure 3:
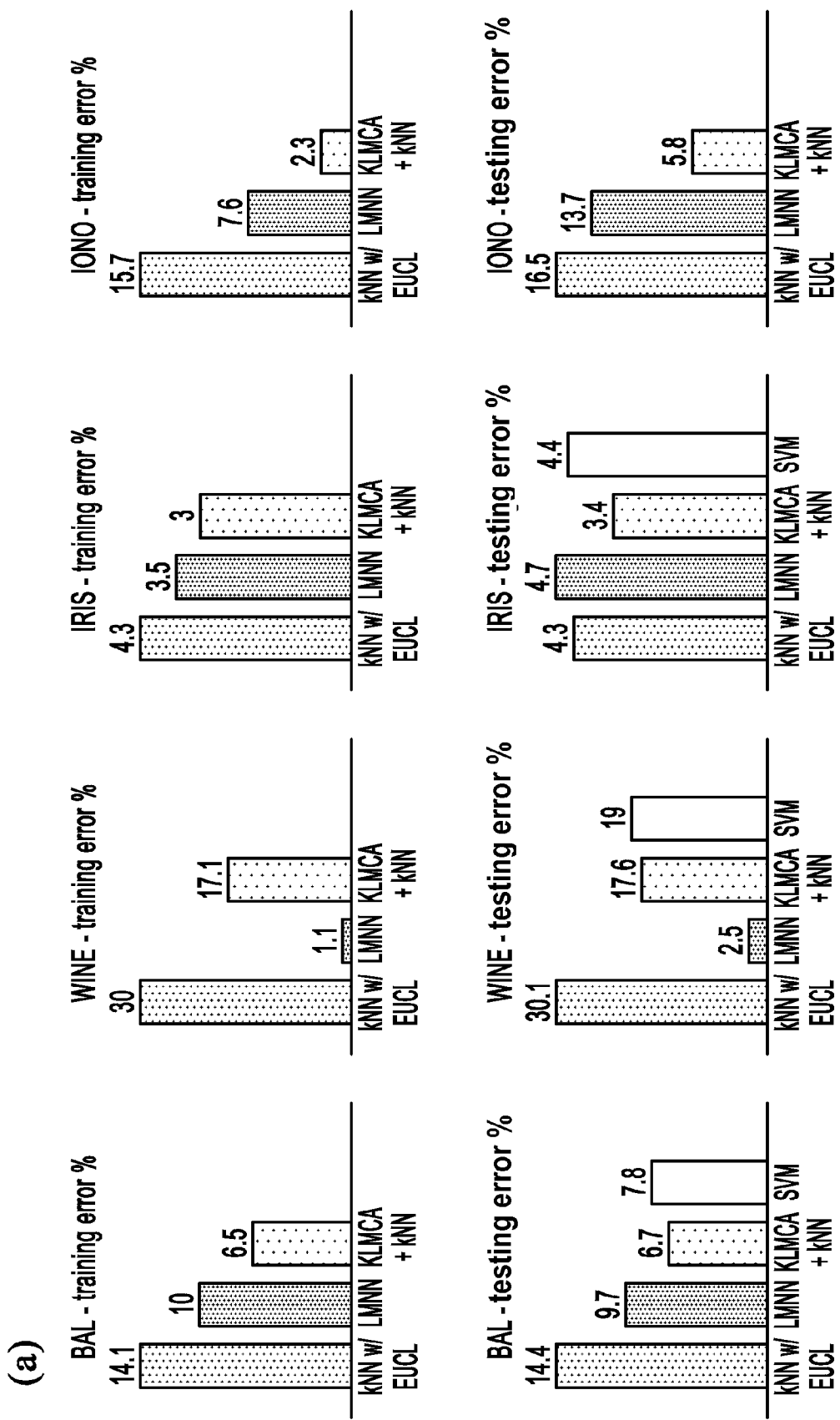
FIG. 3 illustrates kNN classification accuracy on low-dimensional data sets.

FIG. 3 summarizes the results of this comparison. More specifically, kNN classification accuracy on low-dimensional datasets: Bal, Wine, Iris, and Ionosphere. (a) Training error. (b) Testing error. Algorithms are kNN using Euclidean distance, LMNN, kNN in the nonlinear feature space computed by the KLMCA algorithm, and multiclass SVM. The errors were averaged over 100 runs with different 70/30 splits of the data for training and testing. On all datasets except on Wine, for which the mapping to the high-dimensional space seems to hurt performance (note also the high error rate of SVM), KLMCA gives better classification accuracy than LMNN. Note also that the error rates of KLMCA are consistently lower than those previously reported for SVM under identical training and testing conditions.

Among other benefits, embodiments described herein simultaneously optimize the objectives of dimensionality reduction and metric learning. One embodiment seeks, among all possible low-dimensional projections, the one that best satisfies a large margin metric objective. Such an approach contrasts favorably to conventional techniques that are unable to learn metrics in high-dimensions and that must rely on dimensionality reduction methods to be first applied to the data. Although the optimization described herein is not convex, it can be demonstrated that the metrics learned by this solution are consistently superior to those computed by globally-optimal methods forced to search in a low-dimensional subspace.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for performing at least a portion of an image analysis process, the method being implemented by one or more processors and comprising:

receiving an input image represented by a matrix D having a first number of dimensions, wherein each of the first number of dimensions represents a portion of the image;

identifying a metric objective that is related to a desired classification result of performing the image analysis process; and performing a dimensional reduction on the matrix D that optimizes the metric objective, so that a matrix d of a second number of dimensions is identified to represent the input image, wherein the second number of dimensions is less than the first number of dimensions.

2. The method of claim 1, wherein performing a dimensional reduction on the matrix D includes solving for the matrix d using a Euclidian distance in a space that minimizes a metric objective.

3. The method of claim 1, further comprising identifying a nonlinear feature space in the input image, and programmatically learning Mahalanobis distance metrics in nonlinear feature spaces.

4. The method of claim 3, wherein performing a dimensional reduction on the matrix D includes determining a kernalized version of the metric objective, including learning the metric objective.

5. The method of claim 1, wherein performing a dimensional reduction includes using a transformation matrix L that is nonsquare and of a size of d×D, wherein d is less than D.

6. The method of claim 1, wherein receiving an input image includes receiving a face as part of a facial recognition process.

7. A computer storage medium that stores computer executable instructions for performing at least a portion of an image analysis process, the computer executable instructions including instructions that, when executed by one or more processors, cause the one or more processors to perform steps comprising:

receiving an input image represented by a matrix D having a first number of dimensions, wherein each of the first number of dimensions represents a portion of the image;

identifying a metric objective that is related to a desired classification result of performing the image analysis process; and performing a dimensional reduction on the matrix D that optimizes the metric objective, so that a matrix d of a second number of dimensions is identified to represent the input image, wherein the second number of dimensions is less than the first number of dimensions.

8. The computer storage medium of claim 7, wherein the instructions for performing the dimensional reduction include instructions for solving for the matrix d using a Euclidian distance in a space that minimizes a metric objective.

9. The computer storage medium of claim 7, further comprising instructions for identifying a nonlinear feature space in the input image, and programmatically learning Mahalanobis distance metrics in nonlinear feature spaces.

10. The computer storage medium of claim 7, wherein the instructions for performing the dimensional reduction include instructions for determining a kernalized version of the metric objective, including learning the metric objective.

11. The computer storage medium of claim 7, wherein the instructions for performing the dimensional reduction include instructions for using a transformation matrix L that is nonsquare and of a size of d×D, wherein d is less than D.

12. The computer storage medium of claim 7, wherein the instructions for receiving the input image include instructions for receiving a face as part of a facial recognition process.

13. An image analysis system, comprising:
a memory that stores instructions for performing at least a portion of an image analysis process; and
one or more processors configured to:
receive an input image represented by a matrix D having a first number of dimensions, wherein each of the first number of dimensions represents a portion of the image;
identify a metric objective that is related to a desired classification result of performing the image analysis process; and
perform a dimensional reduction on the matrix D that optimizes the metric objective, so that a matrix d of a second number of dimensions is identified to represent the input image, wherein the second number of dimensions is less than the first number of dimensions.

14. The image analysis system of claim 13, wherein the one or more processors are configured to perform the dimensional reduction by solving for the matrix d using a Euclidian distance in a space that minimizes a metric objective.

15. The image analysis system of claim 13, wherein the one or more processors are configured to identify a nonlinear feature space in the input image, and programmatically learning Mahalanobis distance metrics in nonlinear feature spaces.

16. The image analysis system of claim 13, wherein the one or more processors are configured to perform the dimensional reduction by determining a kernalized version of the metric objective, including learning the metric objective.

17. The image analysis system of claim 13, wherein the one or more processors are configured to perform the dimensional reduction by using a transformation matrix L that is nonsquare and of a size of d×D, wherein d is less than D.

18. The image analysis system of claim 13, wherein the one or more processors are configured to receive the input image by receiving a face as part of a facial recognition process.

* * * * *